(12) United States Patent
Joo et al.

(10) Patent No.: US 11,636,305 B2
(45) Date of Patent: Apr. 25, 2023

(54) SITUATION AWARE PERSONAL ASSISTANT (71) Applicant: Microsoft Technology Licensing, LLC, Redmond, WA (US)

(72) Inventors: Tae Hong Joo, Redmond, WA (US); Tarek Z. Elabbady, Redmond, WA (US); Mona Soliman Habib, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 658 days.

(21) Appl. No.: 16/595,663

(22) Filed: Oct. 8, 2019

(65) Prior Publication Data
US 2020/0034683 A1 Jan. 30, 2020

Related U.S. Application Data

(63) Continuation of application No. 15/192,880, filed on Jun. 24, 2016, now Pat. No. 10,474,946.

(51) Int. Cl.
*G06N 3/00* (2006.01)
*B60W 50/00* (2006.01)
(Continued)

(52) U.S. Cl.
CPC ............ *G06N 3/006* (2013.01); *B60W 30/08* (2013.01); *B60W 40/06* (2013.01);
(Continued)

(58) Field of Classification Search
CPC .. B60W 30/08; B60W 40/06; B60W 50/0098; B60W 2520/105; B60W 2540/22; B60K 2370/736; B60K 2370/193
(Continued)

(56) References Cited

U.S. PATENT DOCUMENTS 7,711,355 B1    5/2010  Krueger et al.
9,135,803 B1 *  9/2015  Fields ................... G08B 21/02
(Continued)

FOREIGN PATENT DOCUMENTS

CA    2689757 A1    1/2009
CN    1802273 A     7/2006
(Continued)

OTHER PUBLICATIONS

"Office Action Issued in Korean Patent Application No. 10-2018-7037304", dated May 19, 2022, 15 Pages.
(Continued)

*Primary Examiner* — Tuan C To
(74) *Attorney, Agent, or Firm* — Weaver IP L.L.C.

(57) ABSTRACT

Methods, systems, apparatuses, and computer program products are provided for altering the behavior of an electronic personal assistant based on a situation associated with a mobile device. A situation is sensed with a plurality of sensors to generate sensor data. A situation score is calculated based on the sensor data. Behavior of an electronic personal assistant is altered based on the calculated situation score. In one aspect, the situation is a driving situation in which a driver drives a vehicle on a roadway. In such case, a driving situation score is calculated based on the sensor data, and behavior of the electronic personal assistant is altered based on the calculated driving situation score, such as suspending interactions by the electronic personal assistant with the driver to avoid the driver being distracted.

20 Claims, 7 Drawing Sheets

(51) Int. Cl.
  *H04M 1/725* (2021.01)
  *B60W 30/08* (2012.01)
  *B60W 40/06* (2012.01)
  *G06N 3/006* (2023.01)
  *H04M 1/72463* (2021.01)
  *H04M 1/72454* (2021.01)

(52) U.S. Cl.
  CPC .... *B60W 50/0098* (2013.01); *H04M 1/72463* (2021.01); *B60K 2370/193* (2019.05); *B60K 2370/736* (2019.05); *B60W 2520/105* (2013.01); *B60W 2540/22* (2013.01); *B60W 2554/00* (2020.02); *B60W 2555/20* (2020.02); *H04M 1/72454* (2021.01)

(58) Field of Classification Search
  USPC .......................................................... 701/428
  See application file for complete search history.

(56) References Cited

U.S. PATENT DOCUMENTS

| | | | |
|---|---|---|---|
| 9,171,085 B2* | 10/2015 | Xu | G06F 16/335 |
| 10,118,487 B1* | 11/2018 | Riley, Sr. | B60W 50/16 |
| 10,189,479 B2* | 1/2019 | Innes | H04W 4/027 |
| 10,474,946 B2* | 11/2019 | Joo | G06N 3/006 |
| 2002/0151297 A1 | 10/2002 | Remboski et al. | |
| 2002/0197955 A1 | 12/2002 | Witkowski et al. | |
| 2003/0001742 A1 | 1/2003 | Eshelman et al. | |
| 2006/0167530 A1 | 7/2006 | Flaherty et al. | |
| 2006/0173259 A1 | 8/2006 | Flaherty et al. | |
| 2010/0097239 A1 | 4/2010 | Campbell et al. | |
| 2010/0191411 A1* | 7/2010 | Cook | G07C 5/085 707/754 |
| 2010/0207762 A1* | 8/2010 | Lee | G06V 20/52 340/541 |
| 2012/0136666 A1 | 5/2012 | Corpier et al. | |
| 2013/0137404 A1 | 5/2013 | Kuo | |
| 2013/0204813 A1 | 8/2013 | Master et al. | |
| 2013/0325878 A1* | 12/2013 | de Lichana | G06F 16/22 707/748 |
| 2014/0136013 A1 | 5/2014 | Wolverton et al. | |
| 2014/0142757 A1 | 5/2014 | Ziegler et al. | |
| 2014/0218187 A1* | 8/2014 | Chun | G08B 21/06 340/439 |
| 2014/0282003 A1 | 9/2014 | Gruber et al. | |
| 2016/0014062 A1 | 1/2016 | Patel | |
| 2016/0174074 A1 | 6/2016 | Kim et al. | |
| 2016/0232423 A1* | 8/2016 | Zhong | G06V 20/56 |
| 2016/0350812 A1* | 12/2016 | Priness | G06Q 30/0269 |
| 2017/0067750 A1* | 3/2017 | Day | G08G 1/096750 |
| 2017/0140041 A1* | 5/2017 | Dotan-Cohen | G06Q 10/101 |
| 2017/0206095 A1* | 7/2017 | Gibbs | G06N 3/006 |
| 2017/0344649 A1* | 11/2017 | Vinnakota | G06F 16/9024 |
| 2018/0009442 A1* | 1/2018 | Spasojevic | B60K 28/02 |
| 2018/0285827 A1* | 10/2018 | Dotan-Cohen | G06Q 10/063 |
| 2019/0042627 A1* | 2/2019 | Osotio | G06F 16/24575 |

FOREIGN PATENT DOCUMENTS

| | | | |
|---|---|---|---|
| CN | 101074020 A | 11/2007 | |
| CN | 101295013 A | 10/2008 | |
| CN | 100449577 C | 1/2009 | |
| CN | 101669090 A | 3/2010 | |
| CN | 104797484 A | 7/2015 | |
| CN | 105280209 A | 1/2016 | |
| EP | 1679694 A1* | 7/2006 | G10L 15/22 |
| EP | 2575128 A2 | 4/2013 | |
| EP | 2690847 A1 | 1/2014 | |
| EP | 2750912 A1 | 7/2014 | |
| EP | 2954514 A2 | 12/2015 | |
| FR | 3026542 A1* | 4/2016 | G10L 15/22 |
| JP | 2000338994 A | 12/2000 | |
| JP | 2001191871 A | 7/2001 | |
| JP | 2002120656 A | 4/2002 | |
| JP | 2004050975 A | 2/2004 | |
| JP | 2004512609 A | 4/2004 | |
| JP | 2008191074 A | 8/2008 | |
| JP | 2008233678 A | 10/2008 | |
| KR | 20130120272 A | 11/2013 | |
| WO | 2016081326 A1 | 5/2016 | |

OTHER PUBLICATIONS

"Office Action Issued in Chinese Patent Application No. 201780037727.9", dated Apr. 29, 2022, 22 Pages.
"Office Action Issued in Israel Patent Application No. 263759", dated Jun. 30, 2020, 6 Pages.
"Office Action Issued in Indonesian Patent Application No. P00201810776", dated Sep. 19, 2019, 3 Pages.
"Office Action Issued in Japanese Patent Application No. 2018-559276", dated Nov. 29, 2021, 5 Pages.
"Notice of Allowance Issued in Israel Patent Application No. 263759", dated Mar. 31, 2022, 6 Pages.
"Office Action Issued in Japanese Patent Application No. 2018-559276", dated Apr. 6, 2021, 6 Pages.
"First Office Action and Search Report Issued in Chinese Patent Application No. 201780037727.9", dated Feb. 2, 2021, 13 Pages.
"Fourth Office Action Issued in Chinese Patent Application No. 201780037727.9", dated Jan. 11, 2022, 10 Pages.
"Third Office Action Issued in Chinese Patent Application No. 201780037727.9", dated Sep. 28, 2021, 11 Pages.
"Office Action Issued in Chile Patent Application No. 201803615", dated Dec. 9, 2019, 10 Pages.
"Office Action Issued in Colombian Patent Application No. NC2018/0013675", dated Jan. 22, 2020, 8 Pages. (W/O English Translation).
"Second Office Action Issued in Chinese Patent Application No. 201780037727.9", dated Jun. 23, 2021, 11 Pages.
"Office Action Issued in Indian Patent Application No. 201817045856", dated Jun. 30, 2021, 6 Pages.
"Office Action Issued in European Patent Application No. 17735284.6", dated Mar. 4, 2020, 6 Pages.
"Office Action Issued in Israel Patent Application No. 263759", dated Aug. 4, 2021, 9 Pages.
"Notice of Allowance Issued in Singapore Patent Application No. 11201810890R", dated Aug. 16, 2022, 4 Page.
"Office Action Issued in Australian Patent Application No. 2017281436", dated Aug. 26, 2022, 4 Pages.
"Office Action Issued in Australian Patent Application No. 2017281436", dated Jun. 20, 2022, 4 Pages.
"Office Action Issued in Japanese Patent Application No. 2018-559276", dated Jun. 29, 2022, 4 Pages.
"Office Action Issued in Mexican Patent Application No. MX/a/2018/015623", dated Jul. 5, 2022, 8 Pages.
U.S. Pat. No. 10,474,946, Nov. 12, 2019.
"Office Action Issued in Korean Patent Application No. 10-2018-7037304", dated Oct. 31, 2022, 8 Pages.
"Notice of Allowance Issued in Australian Patent Application No. 2017281436", dated Dec. 1, 2022, 3 Pages.
"Notice of Allowance Issued in Japanese Patent Application No. 2018-559276", dated Nov. 21, 2022, 6 Pages.
"Office Action Issued in Mexican Patent Application No. MX/a/2018/015623", dated Nov. 1, 2022, 6 Pages.
"Office Action Issued in Korean Patent Application No. 10-2018-7037304", dated Feb. 14, 2023, 15 Pages.

* cited by examiner

Suspend interaction by the electronic personal assistant with the driver when the driving situation score satisfies a first predetermined condition to avoid the driver being distracted by the electronic personal assistant

1204

Resume interaction by the electronic personal assistant with the driver when the driving situation score satisfies a second condition

Performing at least one of delaying at least one of verbal or visual communications with the driver, providing at least one of verbal or visual assistance to the driver or providing a suggestion to the driver

SITUATION AWARE PERSONAL ASSISTANT

CROSS REFERENCE TO RELATED APPLICATION

This application is a continuation of allowed U.S. application Ser. No. 15/192,880, filed on Jun. 24, 2016, titled "Situation Aware Personal Assistant," which is incorporated by reference herein in its entirety.

BACKGROUND

An "electronic personal assistant" or "intelligent personal assistant" is an application that executes in a user device, such as a mobile phone, that a user can interact with. The user may speak to the electronic personal assistant, and the electronic personal assistant may response by speech to the user. An electronic personal assistant is configured to provide general assistance by handling user requests, such as requests to perform tasks and/or services. For instance, an electronic personal assistant may be configured to answer questions, make recommendations, and/or perform actions. The electronic personal assistant may further be configured to speak up on its own to provide information to the user based on prior instructions from the user, a location of the mobile device, etc. However, in any case, speaking to the user during situations where the user needs to concentrate on a task, such as driving, may be distracting and even possibly dangerous to the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for altering the behavior of an electronic personal assistant based on a situation. A situation is sensed with a plurality of sensors to generate sensor data. A situation score is calculated based on the sensor data. Behavior of an electronic personal assistant is altered based on the calculated situation score. In one aspect, the situation is a driving situation in which a driver drives a vehicle on a roadway. In such case, a driving situation score is calculated based on the sensor data, and the behavior of the electronic personal assistant is altered based on the calculated driving situation score, such as suspending interactions by the electronic personal assistant with the driver to avoid the driver being distracted.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner

II. Example Embodiments for Bucketing Test Failures

An electronic personal assistant is an application that executes in a user device, such as a mobile phone, that a user can interact with. The user may speak to the electronic personal assistant, and the electronic personal assistant may reply with speech to the user. An electronic personal assistant may be configured to provide general assistance by handling user requests, such as requests for information, or to perform tasks and/or services. For instance, an electronic personal assistant may be configured to answer questions, make recommendations, and/or perform actions. The electronic personal assistant may respond directly to a user request, and/or may speak up on its own to provide information to the user based on a variety of factors, including prior instructions, a location of the mobile device, etc. Numerous electronic personal assistants are available in the marketplace, including Siri® provided by Apple Inc. of Cupertino, Calif., Google Now™ provided by Google, Inc. of Mountain View, Calif., Amazon Echo™ provided by Amazon.com, Inc. of Seattle, Wash., and Cortana™ provided by Microsoft Corporation of Redmond, Wash.

During normal operation, an electronic personal assistant may be activated to communicate or otherwise interact with a user. However, there may be instances where it may be desirable for the electronic personal assistant to alter its behavior, diverging from normal operation. For instance, in conventional driving situations, where a driver of a vehicle (e.g., a driver of a car or truck, a pilot of an aircraft) interacts with an electronic personal assistant, a driver's spoken request to an electronic personal assistant is processed immediately. This is in part because the electronic personal assistant lacks awareness of its surroundings. However, it may be undesirable for an electronic personal assistant to speak to the driver while the driver is driving, particularly under adverse conditions. This is because the voice of the electronic personal assistant may be distracting and therefore dangerous to the user and any other occupants of the vehicle.

Accordingly, in embodiments, the behavior of an electronic personal assistant is altered based on a situation associated with a mobile device. In embodiments, a situation is sensed with a plurality of sensors to generate sensor data. A situation score is calculated based on the sensor data. Behavior of an electronic personal assistant is altered based on the calculated situation score.

For example, in the case of a driving situation, researchers have found that when a driver interacts with Siri®, the driver is distracted and the driver's distracted state lingers over twenty seconds after the interaction ends. Furthermore, it has been observed that cell phone usage in cars increases the automobile accident rate, but having a passenger in a car decreases the accident rate. One explanation for these observations is that a human passenger modulates their speech, resulting in a conversation pattern that does not compete for the driver's attention during critical times.

In one embodiment, how/when an electronic personal assistant speaks in a vehicle, not the actual words used by the electronic personal assistant, is altered, such as to resemble the speech pattern of a passenger.

In such a vehicle embodiment, data regarding the driving situation may be captured in various ways, such as by sensors on the vehicle (e.g., cameras, RADAR, SONAR, and/or LIDAR (light detection and ranging)) to determine the location and movement of other vehicles nearby and road objects, a video camera trained on the driver and/or other sensors to estimate the driver's stress level, real-time vehicle kinematics measurements to determine abrupt acceleration and deceleration, and/or sensors configured to detect local weather conditions such as fog, rain, snow, etc., which develop situation awareness about the immediate surroundings. A level of local awareness provided by such sensing is similar to what an attentive passenger might achieve.

Accordingly, an electronic personal assistant may be caused to wait to interact with the driver (e.g., reply to the driver or initiate conversation) when it is unsafe to distract the driver because one or more of the following conditions exist: loud ambient noise, intense and quickly changing traffic and/or road conditions, the driver's transient negative emotional state (e.g., sudden stress or confusion), an abrupt change in car velocity, and/or a variety of further conditions.

In a driving situation, when responding to a user's request (driver or passenger), in speech or text, the electronic personal assistant may be configured to suspend interacting (e.g., stop speaking) and to wait until the situation is acceptably calm before resuming In an embodiment, a flag may be generated that indicates a speak-or-wait status for the electronic personal assistant. By appropriately delaying the response, the electronic personal assistant does not add to further confusion and clutter faced by the driver.

In another embodiment, the electronic personal assistant may provide proactive assistance to the driver. By processing sensor data as described above, a future potential negative situation for the driver may be predicted, and the driver may be warned in advance by the electronic personal assistant. For example, by sensing the movement of a nearby car, the trajectory of the car can be predicted and the electronic personal assistant can warn the driver if collision is possible.

In addition to providing guidance to avoid traffic accidents, the electronic personal assistant can combine the information obtained from the state of the car, current car location, and the driver's personal information such as the driver's upcoming appointments and events to advise future planning For example, if the vehicle is low on fuel, the electronic personal assistant can suggest a convenient gas station based on the current location, the traffic condition, and the driver's schedule.

Accordingly, in a driving situation embodiment, a situation aware system is configured to estimate a cognitive demand imposed on a driver by the local driving situation, and based on the output value of the situation aware system, the speech user interface of the electronic personal assistant is modified. For example, busy traffic with aggressive and abrupt driving behavior by other drivers claims the full attention of the driver. In such situations, the speech interface the electronic personal assistant may be configured to wait until the cognitive workload demanded by the driving task eases before resuming interaction with the driver.

In an embodiment, an electronic personal assistant's user interface may be modified to incorporate the surrounding traffic condition in a driving situation aware (DSA) system. The DSA system may be configured to use multi-dimensional regression algorithms, such as support vector machine, regression tree, deep neural network, or general model that take in account various sensed conditions, including: (a) the driver's speech pattern (e.g., long pauses or halted, incomplete sentence might indicate busy traffic situation), (b) the driver's facial expression (e.g., a stressed or tense facial expression might indicate busy traffic), (c) the driver's driving behavior (e.g., abrupt steering or acceleration and deceleration might indicate avoidance maneuver), (d) sensor signals (e.g., using available signals from car sensors including radar, video cameras, sonar, IR (infrared) camera, inertial navigation system, LIDAR, etc.), and/or (e) any other sensed conditions.

Figure 1:
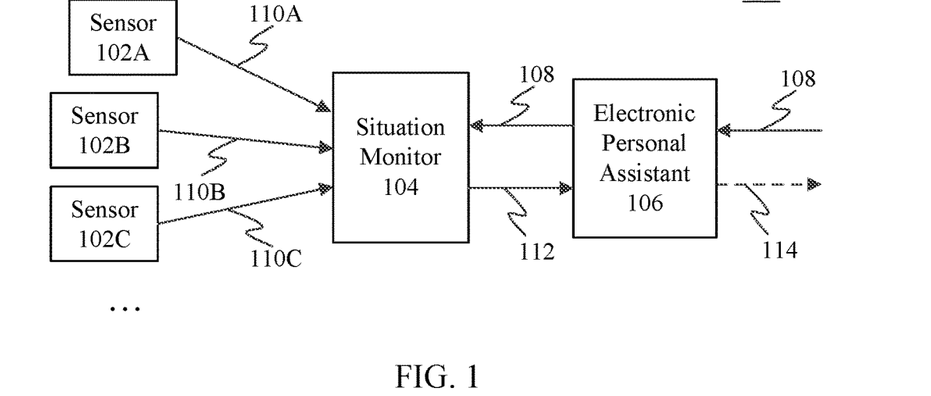
FIG. 1 shows a block diagram of a situation aware system where sensor data is received and processed by a situation monitor to modify behavior of an electronic personal assistant, according to an example embodiment.
Figure 2:
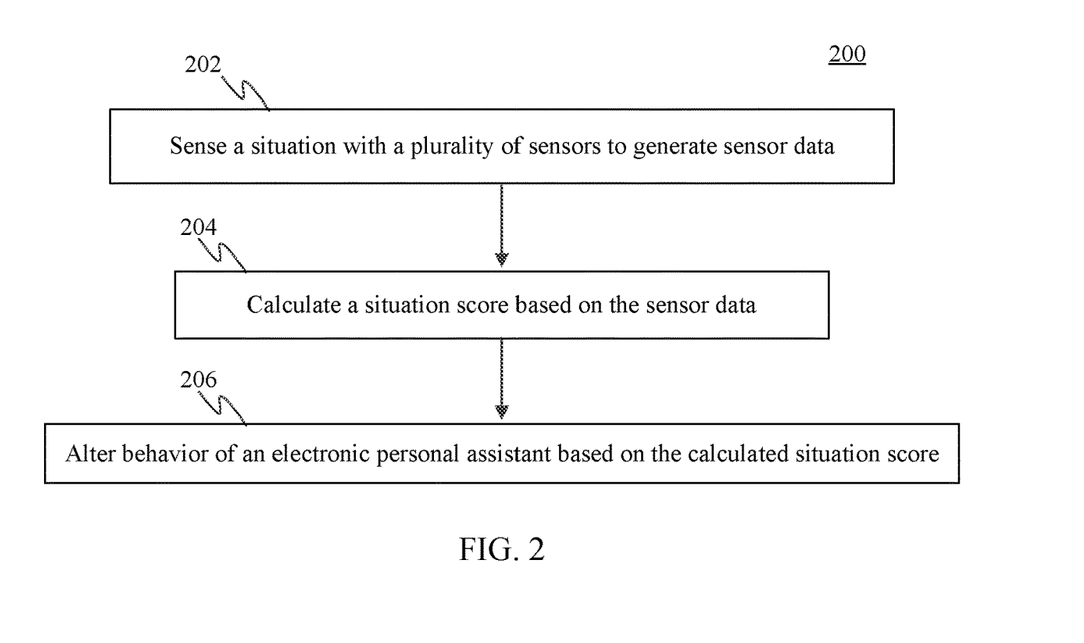
FIG. 2 shows a flowchart providing a process for altering the behavior of an electronic personal assistant based on a situation, according to an example embodiment.

Embodiments may be implemented in various ways. For instance, FIG. 1 shows a block diagram of a situation aware system 100 where sensor data is processed to modify behavior of an electronic personal assistant, according to an example embodiment. As shown in FIG. 1, system 100 includes first-third sensors 102A-102C, a situation monitor 104, and an electronic personal assistant 106. System 100 is described as follows with respect to FIG. 2. FIG. 2 shows a flowchart 200 providing a process for altering the behavior of an electronic personal assistant based on sensing a situation, according to an example embodiment. System 100 may perform flowchart 200 in an embodiment.

Flowchart 200 begins with step 202. In step 202, a situation is sensed with a plurality of sensors to generate sensor data. As shown in FIG. 2, sensors 102A-102C may be configured to sense aspects of a situation. The sensed situation may be any situation taking place in an environment that includes a mobile device or other computing device that includes an electronic personal assistant in use by a user. Example applicable situations include driving situations, flying situations (e.g., a pilot in an aircraft), boating situations, workplace situations (e.g., a user seated at a desktop computer, a user operating machinery, etc.), walking situations (e.g., a user carrying a mobile device on a walk), exercising situations (e.g., a user carrying a mobile device on a run, in a gym, while hiking or climbing), etc.

Sensors 102A-102C are each sensor devices of a same or different type. Three sensors 102A-102C are shown in FIG. 1 for ease of illustration, but in embodiments, any number of sensors may be present in system 100, including tens, hundreds, or even greater numbers of sensors. Examples of sensors 102A-102C include pressure sensors (e.g., air pressure, water pressure), temperature sensors (e.g., home or other building temperature, human body temperature, engine temperature, environmental temperature), ultrasonic sensors, humidity sensors, gas sensors, light sensors, PIR (passive infrared) sensors, noise sensors, acceleration sensors, motion sensors, displacement sensors, biometric sensors (e.g., fingerprint sensor, heart beat sensor, blood pressure sensor, retina sensor, facial recognition sensor, voice sensor), etc. Sensors 102A-102C are each configured to generate an electrical signal indicative of a sensed condition (e.g., temperature, pressure, humidity, etc.), shown as sensor data 110A-110C, respectively. Sensors 102A-102C may generate sensor data 110A-110C in any form, including as an analog electrical signal, a digital electrical signal (e.g., carrying data in the form of electrical highs and lows), etc., and may provide sensor data 110A-110C in a wireless or wired fashion to situation monitor 104.

In step 204, a situation score is calculated based on the sensor data. As shown in FIG. 1, situation monitor 104 receives sensor data, such as sensor data 110A-110C, and is configured to generate a situation score 112 based on the received sensor data. Situation monitor 104 may calculate situation score 112 in any manner, which may take into account any one or more of sensor data 110A-110C (and/or further sensor data), may weight each received sensor data in any manner, and may combine the optionally weighted sensor data in any manner (e.g., according to any equation or formula) to generate situation score 112.

In step 206, behavior of an electronic personal assistant is altered based on the calculated situation score. In an embodiment, situation score 112 is used to alter the behavior of electronic personal assistant 106. For example, as shown in FIG. 1, situation monitor 104 may output situation score 112, which may be received by electronic personal assistant 106, and electronic personal assistant 106 may alter its behavior (e.g., function/operation) based on the value of situation score 112. For example, electronic personal assistant 106 may suspend an action being performed (e.g., stop playing music, stop speaking, stop showing messages, stop showing video, etc.), may begin an action (e.g., begin playing music, begin speaking, show a message, show a video, etc.), and/or may alter behavior in another way. Alternatively, as described further below, instead of outputting situation score 112, situation monitor 104 may instead receive and hold the output of electronic personal assistant 106 from being provided to the user.

For instance, as shown in FIG. 1, a user may optionally provide a request 108 to electronic personal assistant 106 verbally. Request 108 is also received by situation monitor 104 through electronic personal assistant 106 (as shown in FIG. 1) or is directly received from the user. Under normal circumstances, electronic personal assistant 106 may respond verbally to request 108 with an answer 114. Situation score 112, however, may cause electronic personal assistant 106 to change its behavior. In such case, electronic personal assistant 106 may suspend answer 114 (or other interaction) by not speaking to the user, and/or may alter its behavior in another way. Suspending answer 114 may last at least until situation monitor 104 determines electronic personal assistant 106 can resume normal interactions (e.g., the danger has passed).

Such change in a behavior may be made to avoid distraction to the user when the situation is determined, based on a value of situation score 112, to require increased attention from the user (e.g., when flying an aircraft during sensed turbulence). Alternatively, the change in behavior may be the providing of information to the user to aid the user in handling the change in situation (e.g., provide directions to the user to reduce activity to avoid a heart attack during sensed increased blood pressure).

Note that situation aware system 100 of FIG. 1 may be configured in various ways to monitor various types of situations and alter electronic personal assistant behavior accordingly. For instance, FIGS. 3-6 shows example configurations of system 100 for a driving situation. These driving situation examples are provided for purposes of illustration and are not intended to be limiting. The embodiments of FIGS. 3-6 are also applicable to other types of situations mentioned elsewhere herein or otherwise known, as would be apparent to persons skilled in the relevant art(s) from the teachings herein. FIGS. 3-6 are described as follows.

Figure 3:
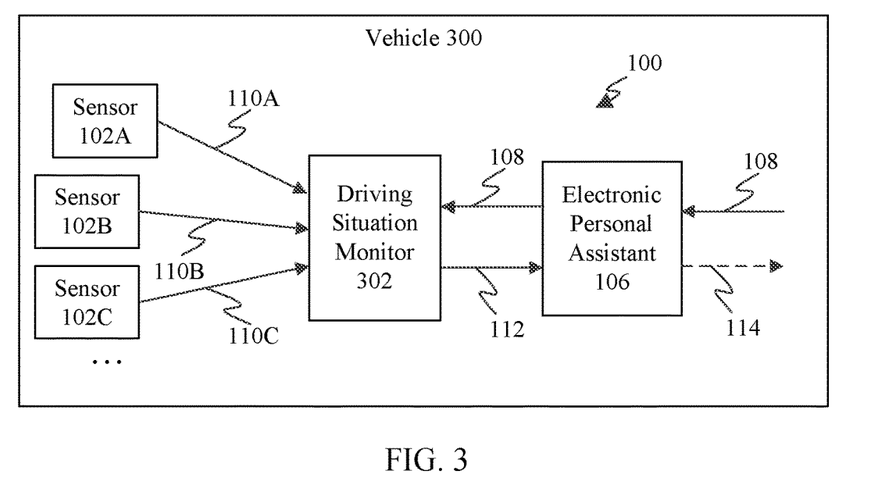
FIG. 3 shows a block diagram of the situation aware system of FIG. 1 implemented in a vehicle to prevent an electronic personal assistant from distracting a driver, according to an example embodiment.

FIG. 3 shows a block diagram of situation aware system 100 implemented in a vehicle 300, according to an example embodiment. Vehicle 300 may be a car, a truck, a train, a watercraft, an aircraft, or other type of vehicle. As shown in FIG. 3, each of first-third sensors 102A-102C, a driving situation monitor 302, and electronic personal assistant 106 are implemented in vehicle 300. Sensors 102A-102C may each be mounted anywhere in or on vehicle 300. Situation monitor 302 is an example of situation monitor 104 configured for a driving situation. Situation monitor 302 and electronic personal assistant 106 may be implemented in a common device or electronics, or may be implemented separately.

Figure 4:
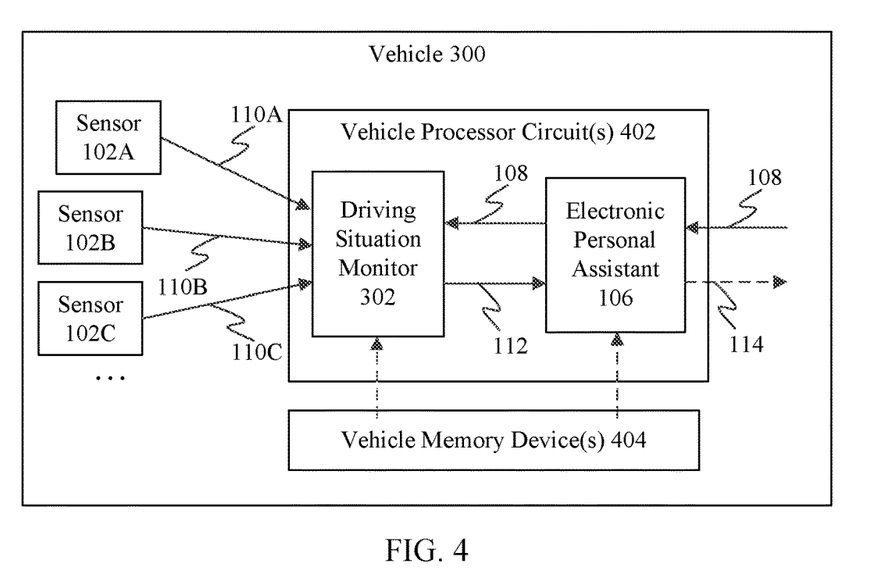
FIG. 4 shows a block diagram of a vehicle-based situation aware system implemented in vehicle electronics, according to an example embodiment.

For example, FIG. 4 shows a block diagram of system 100 implemented in vehicle electronics, according to an example embodiment. As shown in FIG. 4, vehicle 300 includes one or more vehicle processor circuits 402 (e.g., microprocessors, CPUs, etc.) and one or more vehicle memory devices 404 (e.g., random access memory, read only memory, etc.). 300. Sensors 102A-102C may each be mounted anywhere in or on vehicle 300 of FIG. 4. Driving situation monitor 302 and electronic personal assistant 106 may be separate applications (or combined in a single application) stored in vehicle memory device(s) 404 and executed by vehicle processor circuit(s) 402. In such an embodiment, a vehicle user interface (e.g., a dashboard-mounted display) may provide access to electronic personal assistant 106 for the driver, and electronic personal assistant 106 may communicate with the driver via one or more vehicle-mounted loudspeakers and one or more microphones. Driving situation monitor 302 executed by vehicle processor circuit(s) 402 may monitor sensors 102A-102C, and communicate with electronic personal assistant 106 to alter behavior of electronic personal assistant 106 according to the embodiments herein.

Figure 5:
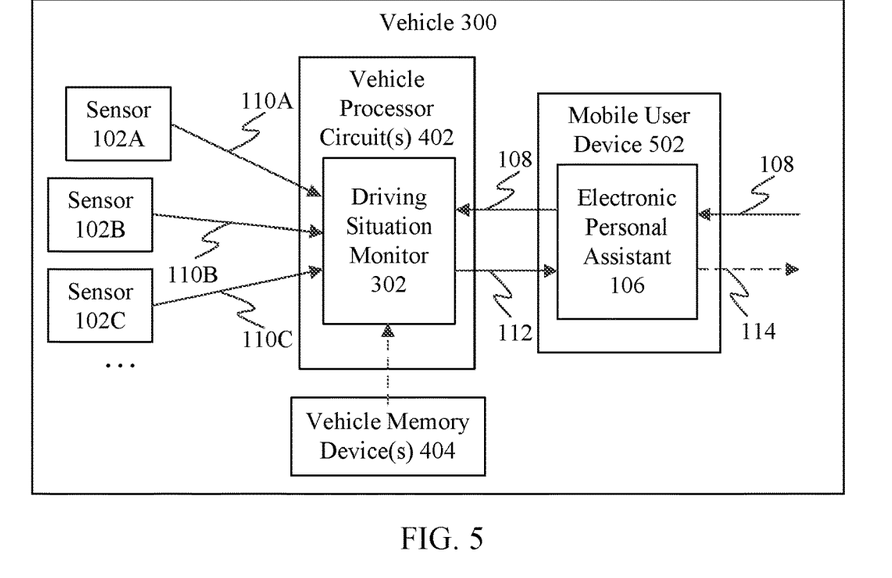
FIG. 5 shows a block diagram of a vehicle-based situation aware system implemented partially in vehicle electronics and partially in a mobile user device, according to an example embodiment.

FIG. 5 shows another vehicle-based embodiment, where system 100 is implemented partially in a vehicle computer and partially in a mobile user device 502. Mobile user device 502 is a mobile device that the driver may transport in and out of vehicle 300. In FIG. 5, sensors 102A-102C may each be mounted anywhere in or on vehicle 300 of FIG. 4. Driving situation monitor 302 is stored in vehicle memory device(s) 404 and executed by vehicle processor circuit(s) 402. Electronic personal assistant 106 is implemented in mobile user device 502, and may interact directly with the user via microphone(s) and loudspeaker(r) of mobile user device 502, or may interact with the user via microphone(s) and loudspeaker(r) of vehicle 300 (e.g., mobile user device 502 may communicate with vehicle 300 via a wired or wireless link). Driving situation monitor 302 may monitor sensors 102A-102C, and communicate with mobile user device 502 to alter behavior of electronic personal assistant 106 according to the embodiments herein.

Figure 6:
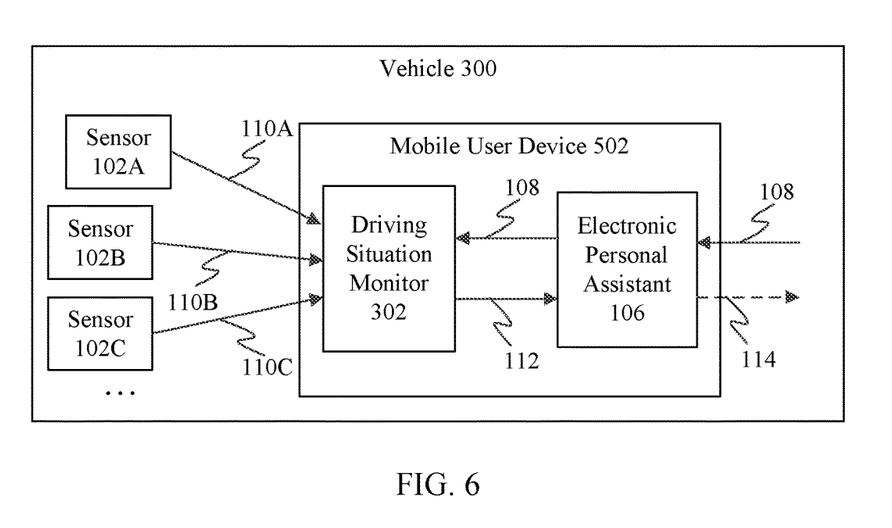
FIG. 6 shows a block diagram of a vehicle-based situation aware system implemented in a mobile user device, according to an example embodiment.

FIG. 6 shows still another vehicle-based embodiment. In FIG. 5, sensors 102A-102C may each be mounted anywhere in or on vehicle 300 of FIG. 4. Driving situation monitor 302 and electronic personal assistant 106 are implemented in mobile user device 502. In such an embodiment, a vehicle interface may interface (e.g., wired or wirelessly) with mobile user device 502 to provide access to electronic personal assistant 106 for the driver, or the driver may communicate directly with electronic personal assistant 106. Driving situation monitor 302 in mobile user device 502 may receive sensor data from sensors 102A-102C (e.g., via a wired and/or wireless interface of vehicle 300) and communicate with electronic personal assistant 106 internal to mobile user device 502 to alter behavior of electronic personal assistant 106 according to the embodiments herein.

Examples of mobile user device 502 include a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), or a wearable computing device (e.g., a smart watch, a head-mounted device including smart glasses such as Google® Glass™, etc.).

Figure 7:
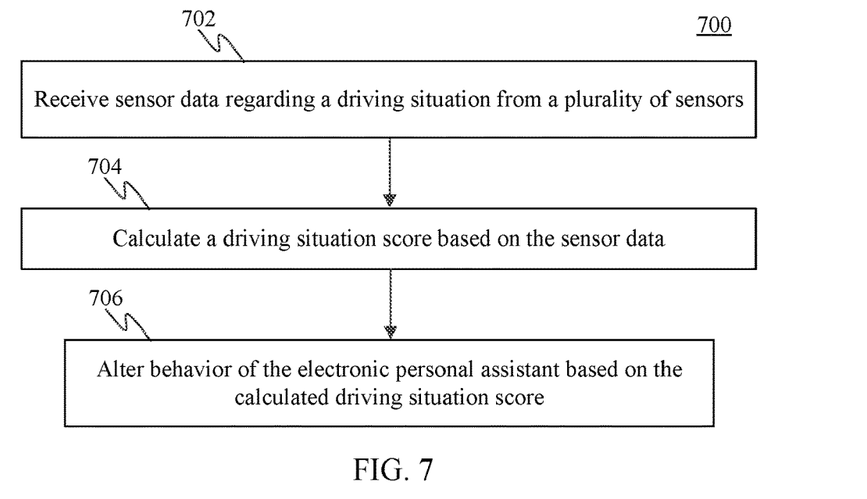
FIG. 7 shows a flowchart providing a process for altering the behavior of an electronic personal assistant in a vehicle based on sensing a driving situation, according to an example embodiment.

Driving situation monitor 302 of FIGS. 3-6 may operate in various ways to perform its functions. For instance, FIG. 7 shows a flowchart 700 providing a process for altering the behavior of an electronic personal assistant in a vehicle based on sensing a driving situation, according to an example embodiment. Flowchart 700 is described as follows.

Flowchart 700 begins with step 702. In step 702, sensor data regarding a driving situation is received from a plurality of sensors. As described above, and as shown in FIGS. 3-6, sensors 102A-102C sense aspects of the driving situation and generate sensor data 110A-110C, respectively, received by driving situation monitor 302. The sensed driving situation takes place in a driving environment that includes a vehicle carrying an electronic personal assistant in use by a user. In a driving (or other) situation, a variety of types of sensors may be present.

Figure 8:
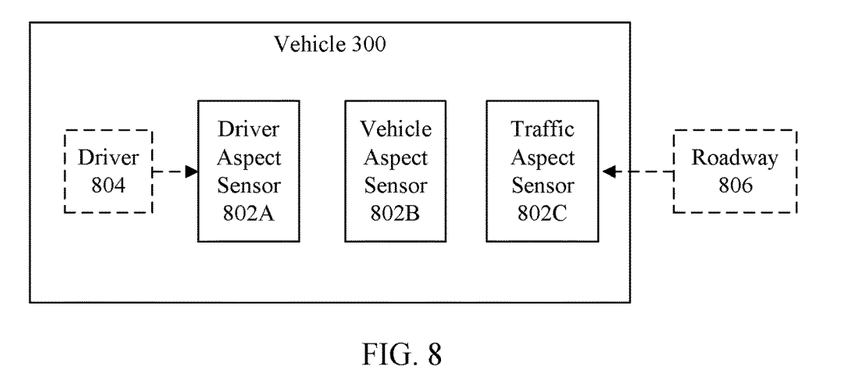
FIG. 8 shows a block diagram of a plurality of sensors for sensing aspects associated with a driving vehicle, according to an example embodiment.
Figure 9:
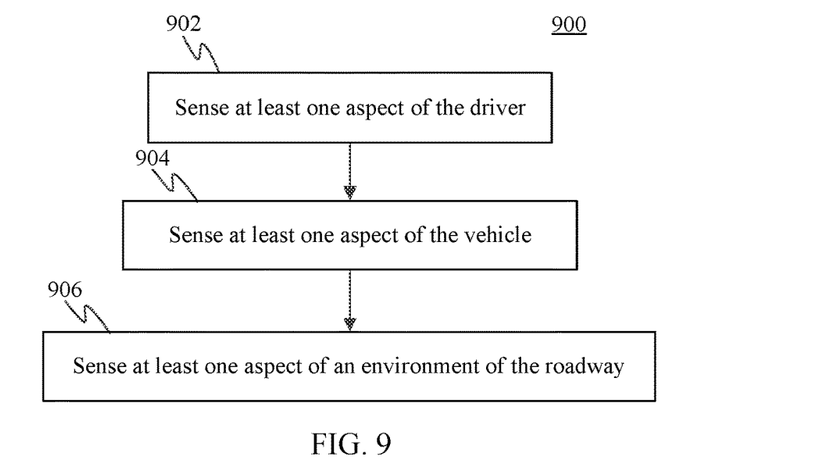
FIG. 9 shows a flowchart providing a process for sensing aspects associated with a driving vehicle, according to an example embodiment.

For example, FIG. 8 shows a block diagram of a plurality of sensors 802A-802C for sensing aspects associated with vehicle 300, according to an example embodiment. Sensors 802A-802C are examples of sensors 102A-102C. Although three sensors 802A-802C are shown in FIG. 8, any number of sensors, and combination of sensor types may be present. FIG. 8 is described with respect to FIG. 9 for purposes of illustration. FIG. 9 shows a flowchart 900 providing a process for sensing aspects associated with a driving vehicle, according to an example embodiment. In an embodiment, sensors 802A-802C may operate according to flowchart 900. Any one or more of the steps of flowchart 900 may be performed in embodiments, in any order. FIG. 8 and flowchart 900 are described as follows.

In step 902, at least one aspect of the driver is sensed. In an embodiment, sensor 802A is a driver aspect sensor 802A configured to sense aspects of a driver 804 (the person driving vehicle 300). The sensor data generated by driver aspect sensor 802A may be used to at least partially determine a driving situation, which accordingly may be used to alter the behavior of an electronic personal assistant of driver 804 (e.g., in a mobile user device of driver 804 or integrated into vehicle 300).

Driver aspect sensor 802A may be any type of sensor capable of sensing aspects of driver 804. For example, driver aspect sensor 802A may be a speech pattern sensor (e.g., microphone(s) coupled with speech recognition software/hardware) configured to monitor a speech pattern of driver 804. The speech pattern sensor may monitor speech of driver 804 for long pauses or halts, incomplete sentences, or other indications of a busy or dangerous traffic situation. In another example, driver aspect sensor 802A may be a facial sensor (e.g., camera(s) directed at the face of driver 804 coupled with facial recognition software/hardware) configured to monitor a facial expression of driver 804. For example, the facial sensor may monitor the face of driver 804 for a stressed or tense facial expression, or other expression that may indicate a busy or dangerous traffic situation. In another example, driver aspect sensor 802A may be a driving behavior sensor (e.g., camera(s) directed at the arms and/or legs of driver 804 coupled with spatial recognition software/hardware) configured to monitor the driving behavior of driver 804. For example, the driving behavior sensor may monitor driver 804 for abrupt steering, acceleration, and/or deceleration that may indicate an avoidance maneuver attempted by driver 804.

In step 904, at least one aspect of the vehicle is sensed. In an embodiment, sensor 802B is a vehicle aspect sensor 802B configured to sense aspects of vehicle 300. The sensor data generated by vehicle aspect sensor 802B may be used to at least partially determine a driving situation, which accordingly may be used to alter the behavior of an electronic personal assistant of driver 804.

Vehicle aspect sensor 802B may be any type of sensor capable of sensing aspects of vehicle 300. For example, vehicle aspect sensor 802A may be a vehicle motion monitor sensor, including one or more acceleration sensors, motion sensors, directional sensors, temperature sensors, cameras, etc. For example, vehicle aspect sensor 802A may monitor vehicle 300 for abrupt changes in motion or direction, including swerving, accelerating, decelerating, sudden stopping, etc., that may indicate avoidance maneuvers by driver 300, by automatic driving systems of vehicle 300, and/or a collision.

In step 906, at least one aspect of an environment of the roadway is sensed. In an embodiment, sensor 802C is a traffic aspect sensor 802C configured to sense aspects of the traffic surrounding vehicle 300 on a roadway 806. The sensor data generated by traffic aspect sensor 802C may be used to at least partially determine a driving situation, which accordingly may be used to alter the behavior of an electronic personal assistant of driver 804.

Traffic aspect sensor 802C may be any type of sensor capable of sensing aspects of traffic on roadway 806. For example, vehicle aspect sensor 802A may be a vehicle/traffic sensor such as a radar dish/antenna, one or more video cameras, a sonar transmitter/receiver, one or more IR (infrared) cameras, an inertial navigation system, a LIDAR system (e.g., a laser and photodetector), etc. Traffic aspect sensor 802C may sense other vehicles and/or obstacles on roadway 806, including their positions and velocities, to sense possible collisions with vehicle 300, between other vehicles and/or obstacles, etc.

Driving situation monitor 302 (FIGS. 3-6) may receive sensor data 110A-110C from one or more of driver aspect sensor 802A, vehicle aspect sensor 802B, and/or traffic aspect sensor 802C, in any numbers and combinations, according to step 702 of flowchart 700 (FIG. 7).

Figure 10:
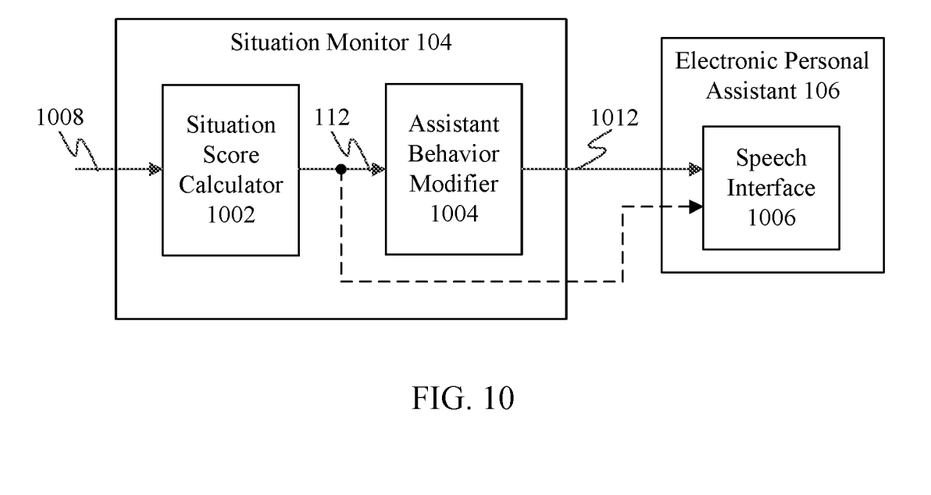
FIG. 10 shows a block diagram of a situation monitor, according to an example embodiment.

Referring back to flowchart 700, in step 704, a driving situation score is calculated based on the sensor data. In embodiments, driving situation monitor 302 may calculate situation score 112 as a driving situation score (e.g., a DSA score) that indicates a real-time traffic hazard level. For example, driving situation monitor 302 may be configured as shown in FIG. 10. FIG. 10 shows a block diagram of situation monitor 104 of FIG. 1, according to an example embodiment. As shown in FIG. 10, situation monitor 104 may include a situation score calculator 1002 and an assistant behavior modifier 1004. In a driving situation, situation score calculator 1002 may be configured to perform step 704 to generate a driving situation score. 112 In other situations, situation score calculator 1002 may generate other types of situation scores, as described elsewhere herein, and as would be known to persons skilled in the relevant art(s) from the teachings herein. Situation score calculator 1002 may generate situation score 112 according to any suitable value system.

Situation score calculator 1002 may configure a driving situation score in any manner, including to have a value between two limits, such as being in the range of 0 to 1, where 0 indicates no traffic and 1 indicates a maximally busy traffic condition. The calculated driving situation score may be provided to, or otherwise used to change the behavior of electronic personal assistant 106.

In embodiments, the driving situation score may be calculated by situation score calculator 1002 based on the sensor data generated by any one or more of driver aspect sensor 802A, vehicle aspect sensor 802B, and/or traffic aspect sensor 802C (and/or further sensor data). Situation score calculator 1002 may calculate situation score 112 in any manner, including weighting each received sensor data in any manner and combining the weighted sensor data in any manner (e.g., according to any equation or formula) to generate situation score 112.

For example, when situation score calculator 1002 implements a general additive model, each sensor data input is processed by a function and the outputs of all functions are added to determine a driving situation score as, such as shown for Equation 1 below:

$$\text{Score} = f1(\text{speech}) + f2(\text{facial image}) + f3(\text{driving behavior}) + f4(\text{vehicle sensors}) + f5(\text{traffic}) + f6(\text{noise}) \quad \text{Equation 1}$$

where:
 f1=a function based on speech pattern sensor data,
 f2=a function based on facial image sensor data,
 f3=a function based on driving behavior sensor data,
 f4=a function based on vehicle sensor data,
 f5=a function based on traffic sensor data, and
 f6=a function based on noise sensor data (e.g., sudden loud noises, etc.).

In embodiments, any one or more of functions f1-f6 may be combined to determine a driving situation score. In an embodiment, functions f1-f6 may each be determined using a training data set, or in other manner In further embodiments, situation score calculator 1002 may implement other techniques for generating situation scores based on sensor data, including multi-dimensional regression algorithms, such as support vector machines, regression trees, deep neural networks, etc.

In embodiments, situation score 112 may be computed by situation score calculator 1002 on a periodic basis, at predetermined times, or upon any other basis.

Referring back to flowchart 700 (FIG. 7), in step 706, behavior of the electronic personal assistant is altered based on the calculated driving situation score. In an embodiment, situation score 112 is used to alter the behavior of electronic personal assistant 106. For example, as shown in FIGS. 1, 3-6 and 10, situation monitors 104/302 output situation score 112. Electronic personal assistant 106 receives and alters its behavior (e.g., function/operation) based on the value of situation score 112. Alternatively, system 100 may be configured as shown in FIG. 10. In FIG. 10, situation score calculator 1002 may generate situation score 112, but does not provide situation score 112 directly to electronic personal assistant 106, but instead provides situation score 112 to assistant behavior modifier 1004, which generates a behavior alteration instruction 1012 that is received by electronic personal assistant 106, and instructs electronic personal assistant to alter one or more behaviors.

Figure 11:
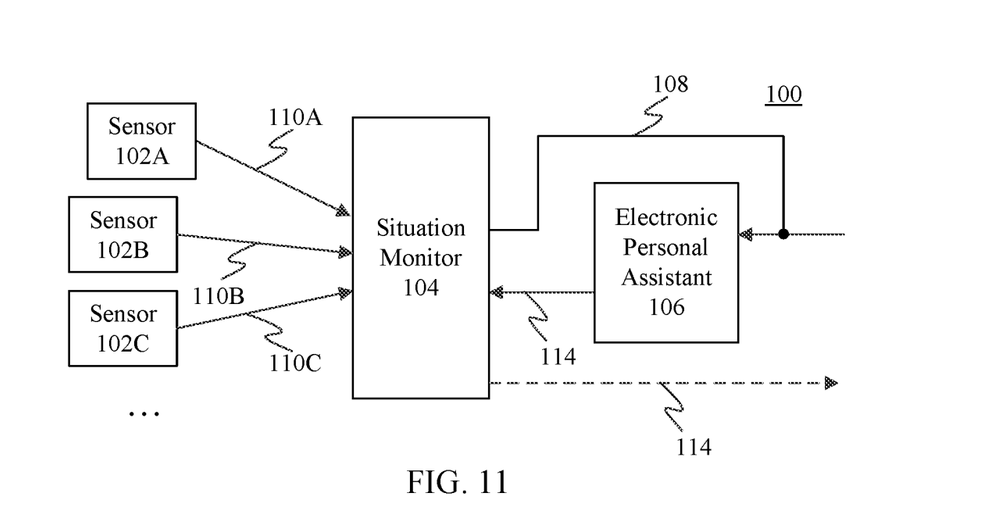
FIG. 11 shows another block diagram of a situation aware system, according to an example embodiment.

In still another embodiment, system 100 may be configured as shown in FIG. 11. In FIG. 11, situation monitor 104 does not provide situation score 112 or behavior alteration instruction 1012 to electronic personal assistant 106. Instead, electronic personal assistant 106 and situation monitor 104 both receive request 108. Electronic personal assistant 106 generates response 114 (e.g., speech intended for the user) based on request 108, and response 114 is intercepted by situation monitor 104 rather than being provided directly to the user. Situation monitor 104 generates a situation score as described herein, and provides response 114 to the user if the situation score warrants such passage (e.g., situation is not dangerous), or suspends providing response 114 to the user if the situation score warrants such suspension (e.g., situation is determined to be dangerous).

Figure 12:
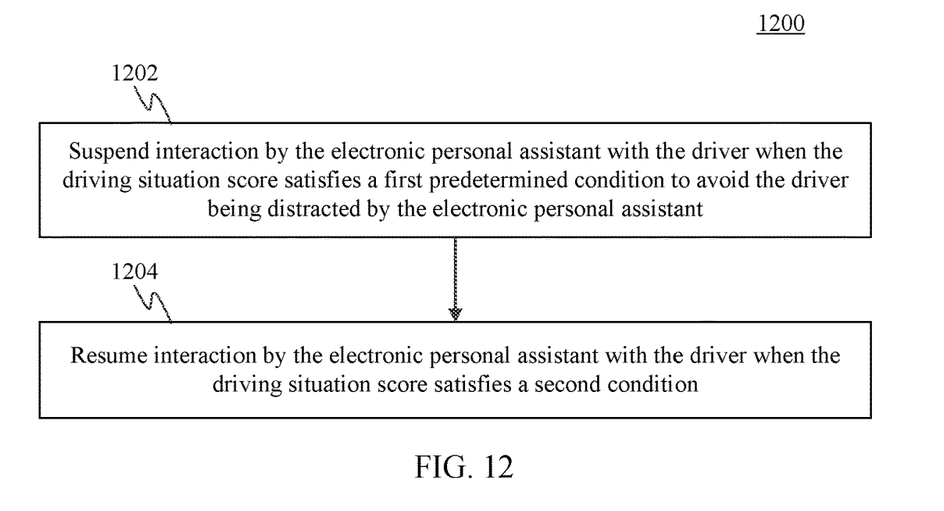
FIG. 12 shows a flowchart providing a process in a vehicle for suspending and resuming interactions by an electronic personal assistant with a driver based on sensed conditions, according to an example embodiment.

Accordingly, based on a received situation score, electronic personal assistant 106 may alter its behavior. In a driving situation embodiment, electronic personal assistant 106 may operate according to FIG. 12. FIG. 12 shows a flowchart 1200 providing a process for suspending and resuming interactions by an electronic personal assistant based on sensed conditions, according to an example embodiment. Flowchart 1200 may be performed during step 706 of flowchart 700 (FIG. 7) and is described as follows.

Flowchart 1200 begins with step 1202. In step 1202, interaction by the electronic personal assistant with the driver is suspended when the driving situation score satisfies a first predetermined condition to avoid the driver being distracted by the electronic personal assistant. As described above, in embodiments, behavior of electronic personal assistant 106 is altered due to electronic personal assistant 106 receiving situation score 112 or behavior alteration instruction 1012, or due to situation monitor 104 withholding response 114 from electronic personal assistant 106. Situation score 112 or behavior alteration instruction 1012 may be configured to cause electronic personal assistant 106 to suspend interactions with the driver, or response 114 may be withheld from electronic personal assistant 106 to cause the interactions to be suspended. This may be performed to avoid distracting the driver during a busy or dangerous driving situation.

For example, when situation score 112 satisfies a first predetermined condition (e.g., has a predetermined relationship with a first predetermined threshold value, such as being greater than, equal to, or less than the first predetermined threshold value, which may be determined by comparing situation score 112 to the first predetermined threshold value), interaction by electronic personal assistant 106 with the driver is suspended. In an embodiment, assistant behavior modifier 1004 may generate behavior alteration instruction 1012 when situation score 112 has a value greater than a predetermined threshold value. In a driving situation embodiment, the first threshold value may correspond to a threshold level of busy traffic above which the driver's attention should be focused on driving. In another embodiment, assistant behavior modifier 1004 may apply a value of situation score 112 to an instruction table. The instruction table lists a plurality of behavior alteration instructions that map to corresponding situation scores/ranges. A behavior alteration instruction is selected from the instruction table corresponding to the value of situation score 112 (e.g., falling into a particular range corresponding to an instruction), and the selected instruction is provided to electronic personal assistant 106. One or more of the listed instructions may include a suspension of interactions. In other embodiments, assistant behavior modifier 1004 may determine behavior alteration instructions 1012 in other ways.

In step 1204 of flowchart 1200, interaction by the electronic personal assistant with the driver is resumed when the driving situation score satisfies a second condition. In embodiments, situation score 112 or behavior alteration instruction 1012 may be configured to cause electronic personal assistant 106 to resume interactions with the driver, or response 114 may be provided to electronic personal assistant 106 by situation monitor 104 to cause interactions to resume. This may be performed when driving conditions have improved enough to sufficiently reduce concerns about distracting the driver with the interactions.

For example, when situation score 112 satisfies a second predetermined condition (e.g., has a predetermined relationship with a second predetermined threshold value, such as being greater than, equal to, is less than the second predetermined threshold value), interaction by electronic personal assistant 106 with the driver is resumed. In an embodiment, assistant behavior modifier 1004 may generate behavior alteration instruction 1012 when situation score 112 has a value less than a second predetermined threshold value. This second threshold value may be the same as the first threshold value used to suspend interactions, or the first and second threshold values may be different from each other (e.g., to provide hysteresis). In a driving situation embodiment, the second threshold value may correspond to a threshold level of busy traffic below which the driver can give some attention to electronic personal assistant 106. In another embodiment, assistant behavior modifier 1004 may apply a value of situation score 112 to the above-described instruction table, which may include entries that enable resumption of interactions, and may extract a corresponding instruction to provide.

As described above, based on situation score 112, electronic personal assistant 106 may suspend performance of any type and number of actions (e.g., stop playing music, stop speaking, stop showing messages, stop showing video, etc.). Alternatively, based on a situation score, electronic personal assistant 106 may begin an action (e.g., begin playing music, begin speaking, show a message, show a video, etc.), and/or may alter behavior in another way.

Figure 13:
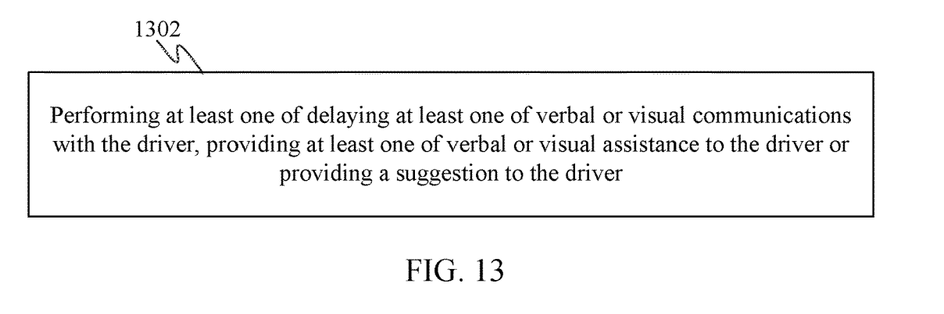
FIG. 13 shows a process for altering behavior of an electronic personal assistant, according to an example embodiment.

In an embodiment, step 706 of flowchart 700 (FIG. 7) may alter behavior according to FIG. 13. FIG. 13 shows a step 1302 for altering behavior of an electronic personal assistant, according to an example embodiment. Step 1302 is described as follows. In step 1302, at least one of delaying at least one of verbal or visual communications with the driver, providing at least one of verbal or visual assistance to the driver, or providing a suggestion to the driver are performed.

In embodiments, to prevent distraction to the driver, verbal or visual (e.g., textual, image, etc.) communications by electronic personal assistant 106 with the driver may be delayed or suspended. For example, with respect to FIG. 10, a speech interface 1006 of electronic personal assistant 106 may receive situation score 112 or behavior alteration instruction 1012. Speech interface 1006 may be capable of disabling and enabling speech communication by electronic personal assistant 106. Upon receiving situation score 112 or behavior alteration instruction 1012, speech interface 1006 may disable speech communication by electronic personal assistant 106 (until re-enabled by corresponding values/instructions of situation score 112 or behavior alteration instruction 1012).

Furthermore, according to step 1302, in other embodiments, electronic personal assistant 106 may provide information to the driver based on situation score 112 or behavior alteration instruction 1012. For instance, based on sensor data regarding the state of the vehicle, a current location, and personal information of the driver (e.g., upcoming appointments and events), electronic personal assistant 106 may provide information to the driver to advise future planning. For example, if the vehicle is detected by sensors to be low on fuel or to have a mechanical problem, electronic personal assistant 106 may suggest a convenient service station based on the current location, traffic conditions, and the driver's schedule.

III. Example Mobile and Stationary Device Embodiments

Sensor monitor 104, electronic personal assistant 106, vehicle processor circuit(s) 402, mobile user device 502, situation score calculator 1002, assistant behavior modifier 1004, speech interface 1006, flowchart 200, flowchart 700, flowchart 1200, and step 1302 may be implemented in hardware, or hardware combined with software and/or firmware. For example, sensor monitor 104, electronic personal assistant 106, 402, situation score calculator 1002, assistant behavior modifier 1004, speech interface 1006, flowchart 200, flowchart 700, flowchart 1200, and/or step 1302 may be implemented as computer program code/instructions configured to be executed in one or more processors and stored in a computer readable storage medium. Alternatively, sensor monitor 104, electronic personal assistant 106, vehicle processor circuit(s) 402, mobile user device 502, situation score calculator 1002, assistant behavior modifier 1004, speech interface 1006, flowchart 200, flowchart 700, flowchart 1200, and step 1302 may be implemented as hardware logic/electrical circuitry.

For instance, in an embodiment, one or more, in any combination, of sensor monitor 104, electronic personal assistant 106, vehicle processor circuit(s) 402, mobile user device 502, situation score calculator 1002, assistant behavior modifier 1004, speech interface 1006, flowchart 200, flowchart 700, flowchart 1200, and step 1302 may be implemented together in a System on a Chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 14:
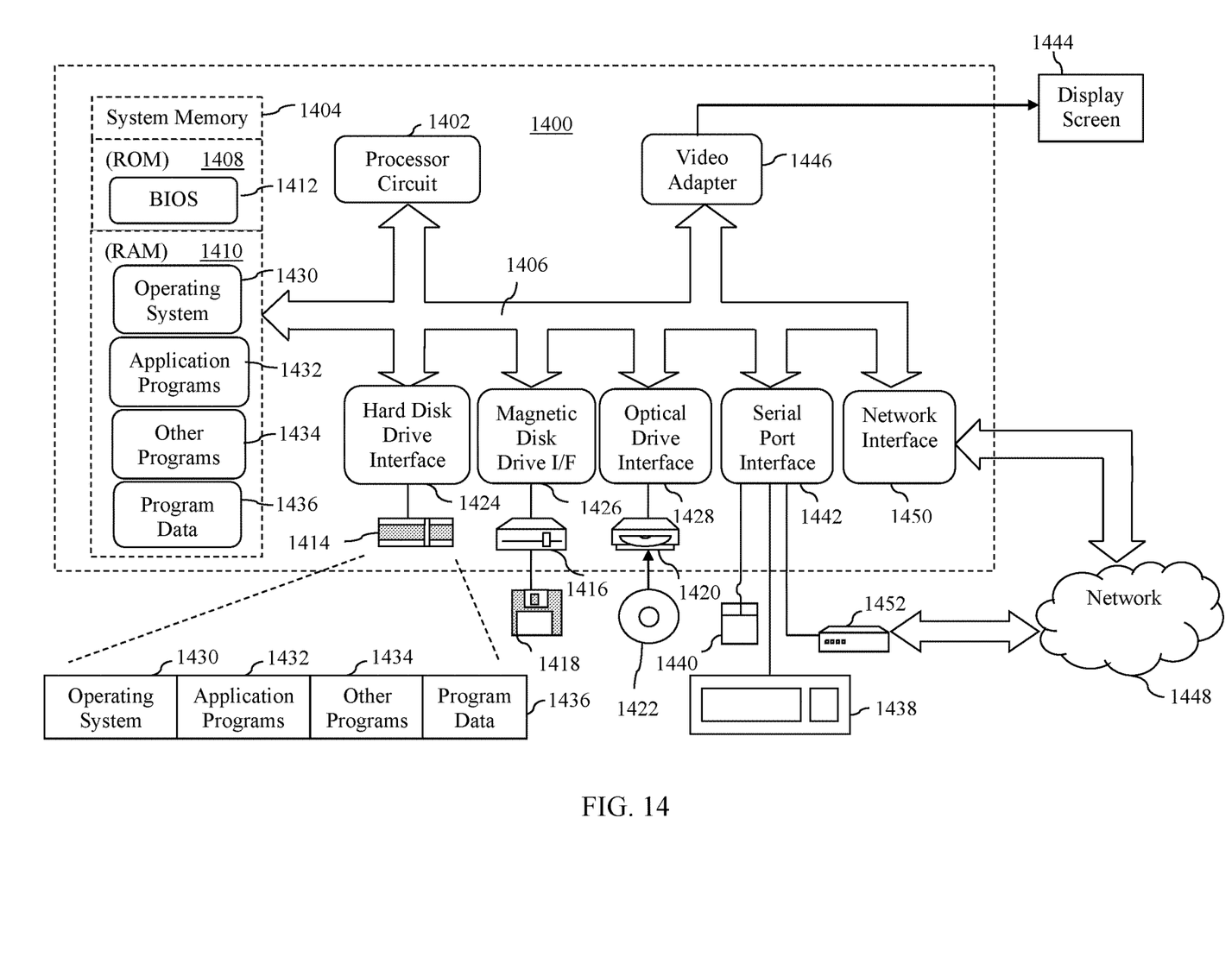
FIG. 14 shows a block diagram of an example computing device that may be used to implement embodiments.

FIG. 14 depicts an exemplary implementation of a computing device 1400 in which embodiments may be implemented. For example, vehicle processor circuit(s) 402 and mobile user device 502 may each be implemented in one or more computing devices similar to computing device 1400 in stationary or mobile computer embodiments, including one or more features of computing device 1400 and/or alternative features. The description of computing device 1400 provided herein is provided for purposes of illustration, and is not intended to be limiting. Embodiments may be implemented in further types of computer systems, as would be known to persons skilled in the relevant art(s).

As shown in FIG. 14, computing device 1400 includes one or more processors, referred to as processor circuit 1402, a system memory 1404, and a bus 1406 that couples various system components including system memory 1404 to processor circuit 1402. Processor circuit 1402 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1402 may execute program code stored in a computer readable medium, such as program code of operating system 1430, application programs 1432, other programs 1434, etc. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computing device 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1430, one or more application programs 1432, other programs 1434, and program data 1436. Application programs 1432 or other programs 1434 may include, for example, computer program logic (e.g., computer program code or instructions) for implementing sensor monitor 104, electronic personal assistant 106, situation score calculator 1002, assistant behavior modifier 1004, speech interface 1006, flowchart 200, flowchart 700, flowchart 1200, and step 1302 (including any suitable step of flowcharts 200, 700, 1200), and/or further embodiments described herein.

A user may enter commands and information into the computing device 1400 through input devices such as keyboard 1438 and pointing device 1440. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1402 through a serial port interface 1442 that is coupled to bus 1406, but may be connected by other interfaces, such as a parallel port, game port, or a universal serial bus (USB).

A display screen 1444 is also connected to bus 1406 via an interface, such as a video adaptor 1446. Display screen 1444 may be external to, or incorporated in computing device 1400. Display screen 1444 may display information, as well as being a user interface for receiving user commands and/or other information (e.g., by touch, finger gestures, virtual keyboard, etc.). In addition to display screen 1444, computing device 1400 may include other peripheral output devices (not shown) such as speakers and printers.

Computing device 1400 is connected to a network 1448 (e.g., the Internet) through an adaptor or network interface 1450, a modem 1452, or other means for establishing communications over the network. Modem 1452, which may be internal or external, may be connected to bus 1406 via serial port interface 1442, as shown in FIG. 14, or may be connected to bus 1406 using another interface type, including a parallel interface.

As used herein, the terms "computer program medium," "computer-readable medium," and "computer-readable storage medium" are used to refer to physical hardware media such as the hard disk associated with hard disk drive 1414, removable magnetic disk 1418, removable optical disk 1422, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1432 and other programs 1434) may be stored on the hard disk, magnetic disk, optical disk, ROM, RAM, or other hardware storage medium. Such computer programs may also be received via network interface 1450, serial port interface 1442, or any other interface type. Such computer programs, when executed or loaded by an application, enable computing device 1400 to implement features of embodiments discussed herein. Accordingly, such computer programs represent controllers of the computing device 1400.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

In one embodiment, a method in at least one computing device comprises: sensing a situation with a plurality of sensors to generate sensor data; calculating a situation score based on the sensor data; and altering behavior of an electronic personal assistant based on the calculated situation score.

In an embodiment, the situation is a driving situation in which a driver drives a vehicle on a roadway, said calculating comprising: calculating a driving situation score based on the sensor data; and said altering comprises: altering behavior of the electronic personal assistant based on the calculated driving situation score.

In an embodiment, the sensing comprises: sensing at least one aspect of the driver.

In an embodiment, the sensing comprises: sensing at least one aspect of the vehicle.

In an embodiment, the sensing comprises sensing at least one aspect of an environment of the roadway.

In an embodiment, the altering comprises: suspending interaction by the electronic personal assistant with the driver on condition that the driving situation score has a predetermined value to avoid the driver being distracted by the electronic personal assistant.

In an embodiment, the suspending interaction comprises: delaying at least one of verbal or visual communications with the driver.

In an embodiment, the altering comprises: providing at least one of verbal or visual assistance to the driver.

In another embodiment, at least one computing device comprises: a situation monitor configured to calculate a situation score based on sensor data received from a plurality of sensors sensing a situation; and an electronic personal assistant configured to alter behavior based on the calculated situation score.

In an embodiment, the situation is a driving situation in which a driver drives a vehicle on a roadway and the situation monitor includes a driving situation monitor configured to calculate a driving situation score based on the sensor data.

In an embodiment, the sensors comprise at least one of: a first sensor configured to sense at least one aspect of the driver; a second sensor configured to sense at least one aspect of the vehicle; or a third sensor configured to sense at least one aspect of an environment of the roadway.

In an embodiment, the electronic personal assistant is configured to alter behavior by suspending interaction by the electronic personal assistant with the driver on condition that the driving situation score has a predetermined value, thereby avoiding the driver being distracted by the electronic personal assistant.

In an embodiment, the at least one computing device further comprises: a mobile user device that implements the driving situation monitor and the electronic personal assistant.

In an embodiment, the at least one computing device further comprises: a mobile user device that implements the electronic personal assistant; and the driving situation monitor is implemented by a processor circuit of the vehicle.

In an embodiment, the at least one computing device further comprises: a processor of the vehicle that implements the driving situation monitor and the electronic personal assistant.

In still another embodiment, a computing device comprises: at least one processor circuit; and a memory that stores program code configured to be executed by the at least one processor circuit to perform operations, the operations including: calculating a situation score based on sensor data received from a plurality of sensors sensing a situation; and causing a behavior of an electronic personal assistant to be altered based on the calculated situation score.

In an embodiment, the situation is a driving situation in which a driver drives a vehicle on a roadway, said calculating comprising: calculating a driving situation score based on the sensor data; and said causing comprises: causing the behavior of the electronic personal assistant to be altered based on the calculated driving situation score.

In an embodiment, the sensing comprises at least one of: sensing at least one aspect of the driver; sensing at least one aspect of the vehicle; or sensing at least one aspect of an environment of the roadway.

In an embodiment, the causing comprises: causing the electronic personal assistant to suspend interaction with the driver on condition that the driving situation score has a predetermined value to avoid the driver being distracted by the electronic personal assistant.

In an embodiment, the causing the electronic personal assistant to suspend interaction with the driver comprises: causing the electronic personal assistant to delay at least one of verbal or visual communications with the driver.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. At least one computing device, comprising:
   at least one processor; and
   a memory that stores program code configured to be executed by the at least one processor to perform operations, the operations including:
   sensing a situation with a plurality of sensors to generate sensor data;
   calculating a situation score based on the sensor data; and
   resuming, by an electronic personal assistant and based on the calculated situation score having a first predetermined relationship with a first threshold, interactions between the electronic personal assistant and a user after the interactions between the electronic personal assistant and the user were previously suspended based on a second threshold different from the first threshold.

2. The at least one computing device of claim 1, wherein said resuming comprises:
   providing, by the electronic personal assistant, information to a user of the at least one computing device.

3. The at least one computing device of claim 2, wherein said providing, by the electronic personal assistant, information to a user of the at least one computing device, comprises at least one of:
   providing directions to the user;
   displaying a message to the user;
   showing a video to the user; or
   playing music to the user.

4. The at least one computing device of claim 1, wherein the situation is a driving situation in which a driver drives a vehicle on a roadway, said calculating comprising:
   calculating a driving situation score based on the sensor data; and said resuming comprises:
   resuming based on the calculated driving situation score.

5. The at least one computing device of claim 4, wherein said performing comprises:
   providing at least one of verbal or visual assistance to the driver.

6. The at least one computing device of claim 4, wherein said sensing comprises:
   sensing at least one aspect of the driver.

7. The at least one computing device of claim 4, wherein said sensing comprises:
   sensing at least one aspect of the vehicle.

8. The at least one computing device of claim 4, wherein said sensing comprises
   sensing at least one aspect of an environment of the roadway.

9. A mobile device, comprising:
   at least one processor; and
   a memory that stores program code configured to be executed by the at least one processor to perform operations, the operations including:
   receiving sensor data regarding a situation of a vehicle;
   calculating a situation score based on the sensor data; and
   transmitting the situation score to an electronic personal assistant implemented by a computer of the vehicle, the electronic personal assistant configured to, based on the situation score having a first predetermined relationship with a first threshold, resume interactions with a user after the interactions between the electronic personal assistant and the user were previously suspended based on a second threshold different from the first threshold.

10. The mobile device of claim 9, wherein the situation is a driving situation in which a driver drives the vehicle on a roadway, said calculating comprising:
    calculating a driving situation score based on the sensor data; and
    wherein the electronic personal assistant is configured to alter a behavior based on the calculated driving situation score.

11. The mobile device of claim 10, wherein the electronic personal assistant is configured to perform an action on condition that the driving situation score has a predetermined value.

12. The mobile device of claim 10, wherein the electronic personal assistant is configured to suspend interaction with the driver on condition that the driving situation score has a predetermined value to avoid the driver being distracted by the electronic personal assistant.

13. The mobile device of claim 12, wherein said operations further comprise:
    receiving additional sensor data regarding a subsequent situation of the vehicle;
    calculating a second driving situation score based on the additional sensor data; and
    transmitting the second driving situation score to the electronic personal assistant implemented by the computer of the vehicle, the electronic personal assistant configured to resume interactions with the driver based on the second driving situation score.

14. The mobile device of claim 10, wherein said calculating a driving situation score based on the sensor data comprises:
calculating the driving situation score based on at least one of:
speech pattern sensor data;
facial image sensor data;
driving behavior sensor data;
vehicle sensor data;
traffic sensor data; or
noise sensor data.

15. A computer implemented in a vehicle, comprising:
at least one processor coupled to a plurality of sensors of the vehicle; and
a memory that stores program code configured to be executed by the at least one processor to perform operations, the operations including:
receiving sensor data regarding a situation of the vehicle;
calculating a situation score based on the sensor data; and
transmitting the situation score to an electronic personal assistant implemented by a mobile device, the electronic personal assistant configured to, based on the situation score having a first predetermined relationship with a first threshold, resume interactions with a user after the interactions between the electronic personal assistant and the user were previously suspended based on a second threshold different from the first threshold.

16. The computer of claim 15, wherein the situation is a driving situation in which a driver drives the vehicle on a roadway, said calculating comprising:
calculating a driving situation score based on the sensor data; and
wherein the electronic personal assistant is configured to alter the behavior based on the calculated driving situation score.

17. The computer of claim 16, wherein the electronic personal assistant is configured to perform an action on condition that the driving situation score has a predetermined value.

18. The computer of claim 16, wherein the electronic personal assistant is configured to suspend interaction with the driver on condition that the driving situation score has a predetermined value to avoid the driver being distracted by the electronic personal assistant.

19. The computer of claim 16, wherein said operations further comprise:
receiving additional sensor data regarding a subsequent situation of the vehicle;
calculating a second driving situation score based on the additional sensor data; and
transmitting the second driving situation score to the electronic personal assistant implemented by mobile device, the electronic personal assistant configured to resume interactions with the driver based on the second driving situation score.

20. The computer of claim 16, wherein said calculating a driving situation score based on the sensor data comprises:
calculating the driving situation score based on at least one of:
speech pattern sensor data;
facial image sensor data;
driving behavior sensor data;
vehicle sensor data;
traffic sensor data; or
noise sensor data.

* * * * *